United States Patent
Kinnaird et al.

(10) Patent No.: US 10,920,641 B2
(45) Date of Patent: Feb. 16, 2021

(54) AUTOMOTIVE EXHAUST AFTERTREATMENT SYSTEM WITH FLASH-BOIL DOSER

(71) Applicant: Faurecia Emissions Control Technologies, USA, LLC, Columbus, IN (US)

(72) Inventors: Edward C. Kinnaird, Columbus, IN (US); John Rohde, Columbus, IN (US); Tony Parrish, Columbus, IN (US); Atul Shinde, Columbus, IN (US); Madhuri Gandikota, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 24 days.

(21) Appl. No.: 16/376,683

(22) Filed: Apr. 5, 2019

(65) Prior Publication Data
US 2020/0318518 A1    Oct. 8, 2020

(51) Int. Cl.
| F01N 3/00 | (2006.01) |
|---|---|
| F01N 3/28 | (2006.01) |
| F01N 3/20 | (2006.01) |
| B01D 53/94 | (2006.01) |
| B01F 3/04 | (2006.01) |
| B01F 5/04 | (2006.01) |
| B01F 13/10 | (2006.01) |

(52) U.S. Cl.
CPC ....... *F01N 3/2892* (2013.01); *B01D 53/9418* (2013.01); *B01D 53/9431* (2013.01); *B01F 3/04049* (2013.01); *B01F 5/0403* (2013.01); *B01F 13/1016* (2013.01); *F01N 3/2066* (2013.01); *F01N 2610/02* (2013.01); *F01N 2610/105* (2013.01); *F01N 2610/1406* (2013.01); *F01N 2610/1433* (2013.01); *F01N 2900/1811* (2013.01)

(58) Field of Classification Search
CPC ........... B01D 53/9418; B01D 53/9431; B01F 3/04049; B01F 5/0403; B01F 13/1016
USPC .......................................................... 60/295
See application file for complete search history.

(56) References Cited

U.S. PATENT DOCUMENTS

| 8,100,191 | B2 | 1/2012 | Beheshti et al. |
|---|---|---|---|
| 8,800,276 | B2 | 8/2014 | Levin et al. |
| 8,967,494 | B2 | 3/2015 | McIntosh et al. |
| 9,072,850 | B2 | 7/2015 | McIntosh et al. |
| 9,341,100 | B2 * | 5/2016 | Petry ........................ F01N 13/14 |
| 10,337,380 | B2 * | 7/2019 | Willats ...................... F01N 3/28 |
| 2003/0079467 | A1 * | 5/2003 | Liu ..................... B01F 3/04049 60/286 |
| 2005/0045179 | A1 | 3/2005 | Faison, Jr. et al. |
| 2006/0218902 | A1 * | 10/2006 | Arellano ............... F23D 11/103 60/295 |

(Continued)

FOREIGN PATENT DOCUMENTS

WO    2018075061 A1    4/2018

*Primary Examiner* — Jason D Shanske
(74) *Attorney, Agent, or Firm* — Barnes & Thornburg LLP (57) ABSTRACT

An exhaust aftertreatment system for use with over-the-road vehicle is disclosed. The exhaust aftertreatment system includes a reducing agent mixer with a mixing can and a flash-boil doser configured to inject heated and pressurized reducing agent into the mixing can for distribution throughout exhaust gases passed through the mixing can.

15 Claims, 8 Drawing Sheets

(56) References Cited

U.S. PATENT DOCUMENTS

| | | | |
|---|---|---|---|
| 2012/0322012 A1* | 12/2012 | Tsumagari | F01N 3/025 |
| | | | 431/159 |
| 2015/0135683 A1 | 5/2015 | Petry | |
| 2016/0017780 A1* | 1/2016 | Kinugawa | F01N 3/2006 |
| | | | 60/286 |
| 2018/0080360 A1* | 3/2018 | Kurpejovic | F01N 3/2066 |
| 2020/0131966 A1* | 4/2020 | Jeannerot | F01N 3/2066 |

\* cited by examiner

AUTOMOTIVE EXHAUST AFTERTREATMENT SYSTEM WITH FLASH-BOIL DOSER

BACKGROUND

The present disclosure relates to exhaust aftertreatment systems for automotive applications, and particularly to mixing devices included in exhaust aftertreatment systems. More particularly, the present disclosure relates to injectors for injecting reducing agents, such as urea solutions, into exhaust streams to mix with the exhaust stream so that chemical reaction between the reducing agent and exhaust gases reduces Nitrous Oxides (NOx) in the exhaust gas.

SUMMARY

An over-the-road vehicle in accordance with the present disclosure includes an internal combustion engine that produces exhaust gases and an exhaust aftertreatment system configured to treat the exhaust gases before releasing them into the atmosphere. The exhaust aftertreatment system can include a number of components such as, for example, a diesel oxidation catalyst (DOC), a diesel particulate filter (DPF), a selective catalytic reduction unit (SCR), and reducing agent mixer.

The reducing agent mixer includes a mixing can defining at least a portion of an exhaust passageway for receiving a flow of exhaust gases therein and a flash-boil doser. The flash-boil doser is mounted to the mixing can and configured to inject a reducing agent through an injection aperture formed in the mixing can.

The flash-boil doser includes a doser body in which reducing agent is conditioned before injection into an exhaust stream, a doser inlet coupled to the doser body, and a doser outlet coupled to the doser body. The doser body defines a flash-boil chamber with at least one heater arranged in the flash-boil chamber to heat reducing agent and thereby increase a pressure within the flash-boil chamber. The doser inlet defines an inlet passageway that opens into the flash-boil chamber to admit reducing agent from an associated reducing agent tank. The doser outlet defines an outlet passageway that opens from the flash-boil chamber into the exhaust passageway of the mixing can.

The doser outlet includes a pressure-activated outlet valve that blocks or allows flow through the outlet passageway. The pressure-activated outlet valve is configured to move from a normally-closed position to an open position when a predetermined pressure within the flash-boil chamber is reached to discharge the heated reducing agent from the flash-boil chamber through the outlet passageway and into the exhaust passageway. In this way, reducing agent is injected at a preselected pressure and at a desired temperature for mixing with the exhaust gases in the mixing can during use of the reducing agent mixer.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
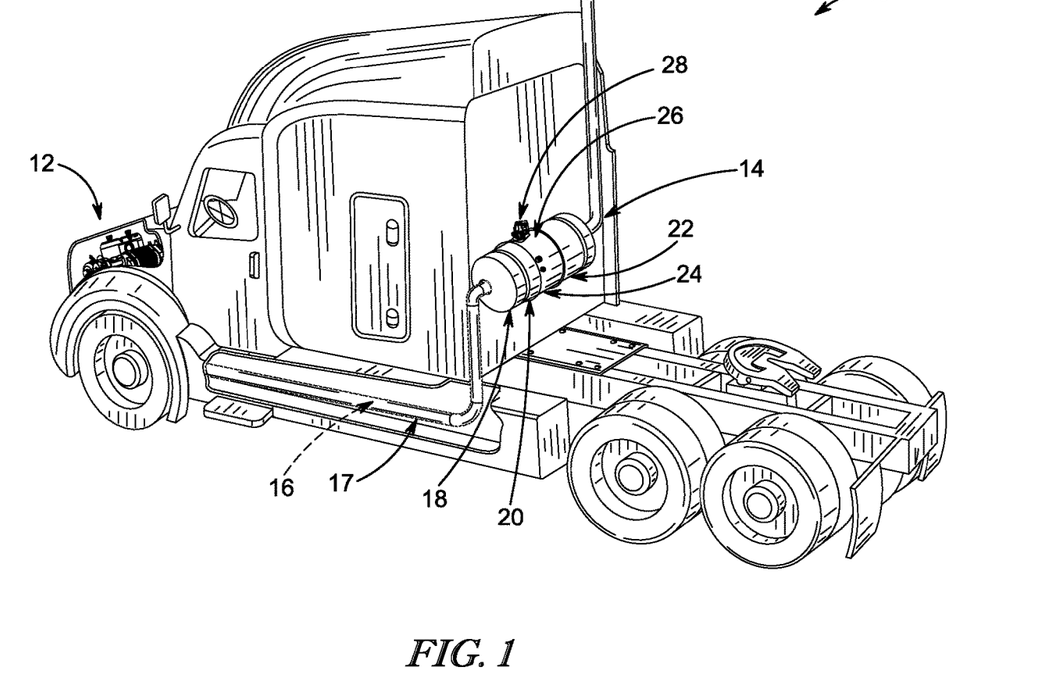
FIG. 1 is perspective view of an over-the-road automotive vehicle including an internal combustion engine and an exhaust aftertreatment system with a flash-boil doser configured to deliver a reducing agent into engine exhaust gases to treat the exhaust gases before the exhaust gases are discharged into atmosphere.

An illustrative over-the-road vehicle 10 includes an engine 12 an exhaust aftertreatment system 14 in accordance with the present disclosure as shown, for example, in FIG. 1. The engine 12 is, illustratively, an internal combustion engine configured to combust fuel and discharge exhaust gases that are carried through an exhaust passageway 16 defined by an exhaust conduit 17, treated by the exhaust aftertreatment system 14, and then released into the atmosphere. The exhaust aftertreatment system 14 is configured to reduce various effluents in the exhaust gases, such as, for example, nitrogen oxides (NOx), before the exhaust gases are released to the atmosphere.

In the illustrative embodiment, the exhaust aftertreatment system 14 includes a plurality of exhaust aftertreatment devices such as, for example, a diesel oxidation catalyst (DOC) 18, a diesel particulate filter (DPF) 20, and a selective catalytic reduction unit (SCR) 22, and a reducing agent mixer 24. The exhaust gases pass through or by each of the aftertreatment devices to remove or reduce different effluents. The reducing agent mixer 18 is mounted upstream of the SCR and is configured to inject and mix a reducing agent, illustratively a urea solution, into the exhaust gases. Chemical reaction of the reducing agent with the exhaust gases occurs in downstream of the reducing agent mixer 24 in the SCR 20 to reduce $NO_x$ before the exhaust gases are released in the atmosphere.

Figure 2:
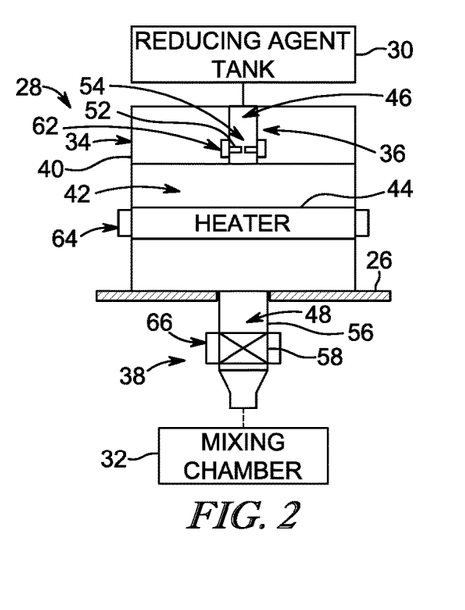
FIG. 2 is a cross-sectional and diagrammatic view of a first embodiment of a flash-boil doser in accordance with the present disclosure showing that the flash-boil doser includes (i) a doser body defining a flash-boil chamber and (ii) an orifice plate located upstream of the flash-boil chamber with an orifice aperture sized to admit reducing agent into the flash-boil chamber and limit reducing agent from flowing back out of the flash-boil chamber.
Figure 2A:
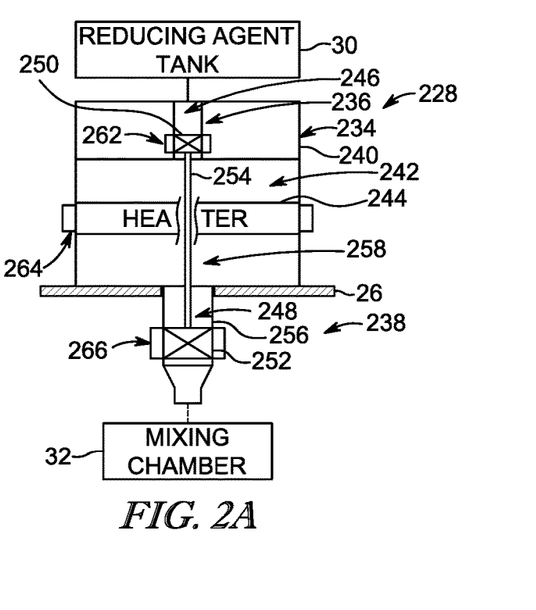
FIG. 2A is a cross-sectional and diagrammatic view of a second embodiment of a flash-boil doser in accordance with the present disclosure showing that the flash-boil doser includes a doser body defining a flash-boil chamber and a connector rod extending between an inlet valve and an exit valve to cause the inlet valve and the exit valve to move in unison as pressure changes within the flash-boil chamber.

The reducing agent mixer 24 includes a mixing can 26 and a flash-boil doser 28, 228 as shown in FIGS. 2 and 2A. The mixing can 26 is coupled fluidly with the exhaust passageway 16 to receive the exhaust gases flowing therethrough. The reducing agent is stored on the vehicle 10 in a reducing agent tank 30 and is conducted to the flash-boil doser 28, 228 for heating prior to being discharged by the flash-boil doser 28, 228 into a mixing chamber 32 defined by the mixing can 26.

A first embodiment of a flash-boil doser 28 is shown in FIG. 2 and includes a doser body 34, a doser inlet 36, and a doser outlet 38. The doser body 34 includes a housing 40 that defines a flash-boil chamber 42 and at least one heater 44 arranged in the flash-boil chamber 42 to heat reducing agent and thereby increase a pressure within the flash-boil chamber 42. The doser inlet 36 is coupled to the doser body 34 and defines an inlet passageway 46 that opens into the flash-boil chamber 42 to admit reducing agent from the reducing agent tank 30. The doser outlet 38 is coupled to the doser body 34 and defines an outlet passageway 48 that opens from the flash-boil chamber 42 into the mixing chamber 32 of the mixing can 26 and, hence, the exhaust passageway 16.

The doser inlet 36 includes an inlet tube 50 defining the inlet passageway 46 and an orifice plate 52 coupled to the inlet tube 50 within the inlet passageway 46 as shown in FIG. 2. The orifice plate 52 is arranged in the inlet tube 50 to restrict flow through the inlet passageway 46 is formed to include an orifice aperture 54 for admitting reducing agent into the flash-boil chamber 42 from the reducing agent tank 30. The inlet passageway 46 has a first cross-sectional area while the orifice aperture 54 has a second cross-sectional area that is smaller than the first cross-sectional area.

The orifice aperture 54 is sized to admit reducing agent through the orifice plate 52 and into the flash-boil chamber 42 when a pressure within the flash-boil chamber 42 is below the predetermined pressure. The orifice aperture 54 is also sized to limit reducing agent from flowing from the flash-boil chamber 42 back through the orifice aperture 54 away from the flash-boil chamber 42 when the pressure within the flash-boil chamber 42 is at or above the predetermined pressure.

The doser outlet 38 includes an outlet tube 56 defining the outlet passageway 48 and a pressure-activated outlet valve 58 that blocks or allows flow through the outlet passageway 48 in response to the pressure within the flash-boil chamber 42 as shown in FIG. 2. The pressure-activated outlet valve 58 is configured to move from a normally-closed position to an open position when a predetermined pressure within the flash-boil chamber is reached. Once the predetermined pressure is reached, the reducing agent is discharged from the flash-boil chamber 42 through the outlet passageway 46 and into the exhaust passageway 16 for mixing with the exhaust gases therein.

The heater 44 within the flash-boil chamber 42 is configured to heat reducing agent that is admitted through the orifice aperture 54. Meanwhile, the pressure-activated outlet valve 58 is in the normally-closed position due to the pressure of the reducing agent in the flash-boil chamber 42 being less than the predetermined pressure. The pressure of the reducing agent in the flash-boil chamber 42 may be increased by heating the reducing agent with the heater 44. As a result of this, the reducing agent expands due to thermal expansion raising the pressure inside the flash-boil chamber 42. Due to the pressure of the reducing agent within the flash-boil chamber 42, the reducing agent may be heated to a temperature that is higher than its normal boiling point. Additionally, the reducing agent may be pre-heated with additional heaters and/or pumps prior to entering the flash-boil chamber 42. The pressure-activated outlet valve 58 changes to the open position once the predetermined pressure is reached within the flash-boil chamber 42.

As will be described, the reducing agent inside the flash-boil chamber 42 can be monitored by one or more sensors located in the chamber or close to the chamber. The pressure-activated outlet valve 58 may be a mechanical valve that opens automatically as soon as the predetermined pressure is reached, or controlled actively and opened in response to receipt of a sensor signal indicating that the predetermined pressure has been reached.

The flash-boil doser 28 further includes a cooling system configured to selectively cool the temperature of select components included in the flash-boil doser 28 as shown in FIG. 2. The cooling system includes at least one of a first cooler 62 coupled to an outer surface of the doser inlet 36 and aligned axially with the orifice plate 52, a second cooler 64 coupled to the doser body 34, and a third cooler 66 coupled to the doser outlet 38 and aligned axially with the pressure-activated valve 58. Each of the coolers 62, 64, 66 are illustratively embodied as ducts that hold and circulate a coolant fluid therethrough to cause heat transfer between the flash-boil doser 28 and the coolant fluid. The ducts of each cooler 62, 64, 66 may be sized according to an amount of thermal heat transfer desired at each location.

A second embodiment of a flash-boil doser 228 is shown in FIG. 2A and includes a doser body 234, a doser inlet 236, and a doser outlet 238. The doser body 234 includes a housing 240 that defines a flash-boil chamber 242 and at least one heater 244 arranged in the flash-boil chamber 242 to heat reducing agent and thereby increase a pressure within the flash-boil chamber 242. The doser inlet 236 is coupled to the doser body 234 and defines an inlet passageway 246 that opens into the flash-boil chamber 242 to admit reducing agent from the reducing agent tank 30. The doser outlet 238 is coupled to the doser body 234 and defines an outlet passageway 248 that opens from the flash-boil chamber 242 into the mixing chamber 232 of the mixing can 26 and, hence, the exhaust passageway 16.

The doser outlet 238 includes an outlet tube 256 defining the outlet passageway 248 and a pressure-activated outlet valve 258 that blocks or allows flow through the outlet passageway 248 in response to the pressure within the flash-boil chamber 242 as shown in FIG. 2. The pressure-activated outlet valve 258 is configured to move from a normally-closed position to an open position when a predetermined pressure within the flash-boil chamber 242 is reached. Once the predetermined pressure is reached, the reducing agent is discharged from the flash-boil chamber 242 through the outlet passageway 246 and into the exhaust passageway 16 for mixing with the exhaust gases therein.

The pressure-activated outlet valve 258 includes an inlet valve 250 that blocks or allows flow through the inlet passageway 246, an outlet valve 252 that blocks or allows flow through the outlet passageway 248, and a connector rod 254 mechanically interconnecting the inlet valve 250 and the outlet valve 252. The connector rod 254 is configured to cause the inlet valve 250 to move to a closed position in response to motion of the pressure-activated outlet valve 258 to the opened position and to cause the inlet valve 250 to move to an opened position in response to motion of the pressure-activated outlet valve 258 to the closed position. Reducing agent is admitted into the flash-boil chamber 242 when the inlet valve 250 is in the opened position. Reducing agent is discharged from the flash-boil chamber 242 when the outlet valve 252 is in the opened position in response to the pressure within the flash-boil chamber reaching the predetermined pressure. The heater 244 is configured to heat the reducing agent to increase the pressure within the flash-boil chamber 242 in the same way as described above regarding flash-boil doser 28.

The flash-boil doser 228 further includes a cooling system configured to selectively cool the temperature of select components included in the flash-boil doser 228 as shown in FIG. 2A. The cooling system includes at least one of a first cooler 262 coupled to an outer surface of the doser inlet 236 and aligned axially with the inlet valve 250, a second cooler 264 coupled to the doser body 234, and a third cooler 266 coupled to the doser outlet 238 and aligned axially with the outlet valve 252. Each of the coolers 262, 264, 266 are illustratively embodied as ducts that hold and circulate a coolant fluid therethrough to cause heat transfer between the flash-boil doser 228 and the coolant fluid. The ducts of each cooler 262, 264, 266 may be sized according to an amount of thermal heat transfer desired at each location.

The doser inlet 36 and the doser outlet 38 are generally aligned along an axis 35 as shown in FIG. 2. However, in other embodiments, the doser inlet 36 and the doser outlet 38 may be misaligned as shown in FIGS. 3 and 4.

Figure 3:
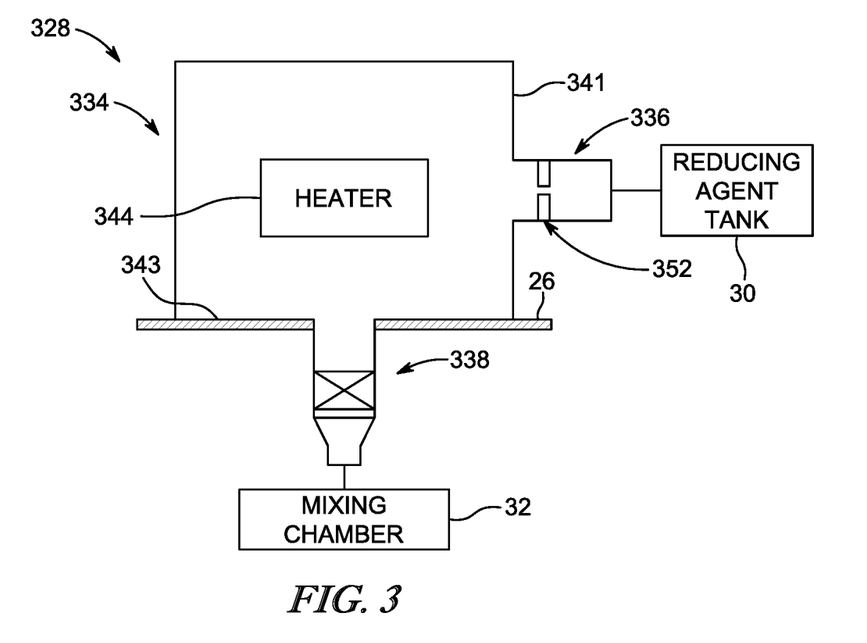
FIG. 3 is a cross-sectional and diagrammatic view of a third embodiment of a flash-boil doser in accordance with the present disclosure including a doser body, a doser inlet coupled to a side wall of the doser body, and a doser outlet coupled to a bottom wall of the doser body.

A third embodiment of a flash-boil doser 328 is shown in FIG. 3 and includes a doser body 334, a doser inlet 336, and a doser outlet 338. The flash-boil doser 328 is similar to flash boil doser 28 and similar reference numbers in the 300 series are used in FIG. 3 to denote similar features between flash-boil doser 28 and flash boil doser 328. The flash-boil doser 328 is different from the flash-boil doser 28 in that the doser inlet 336 is coupled to a side wall 341 of the doser body 334 while the doser outlet 338 is coupled to a bottom wall 343 of the doser body 334.

Figure 4:
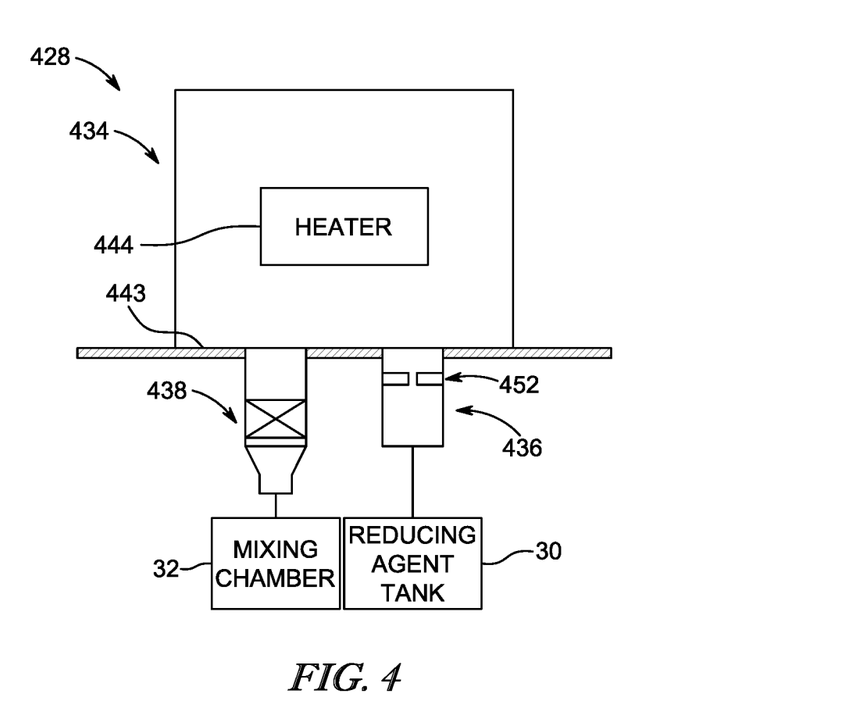
FIG. 4 is a cross-sectional and diagrammatic view of a fourth embodiment of a flash-boil doser in accordance with the present disclosure including a doser body, a doser inlet coupled to a bottom wall of the doser body, and a doser outlet coupled to the bottom wall of the doser body.
Figure 5:
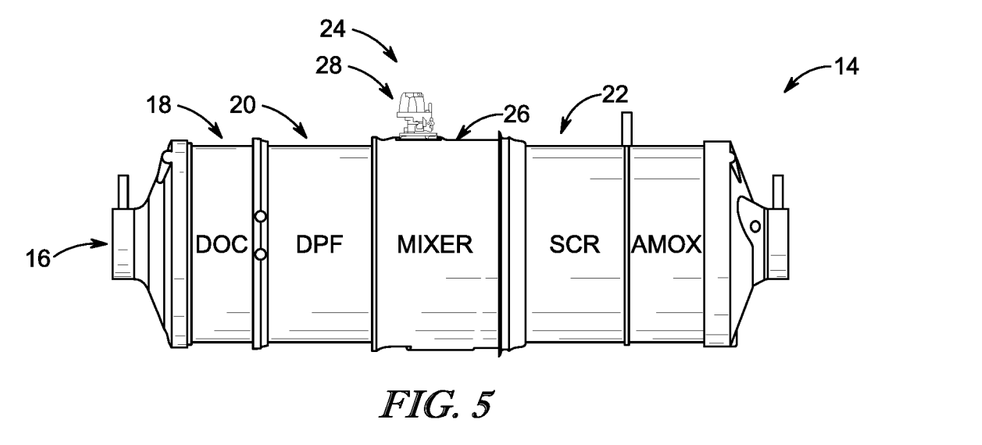
FIG. 5 is a side elevation view of a portion of an exhaust aftertreatment system showing a reducing agent mixer with a flash-boil doser mounted to a mixer can.

A fourth embodiment of a flash-boil doser 428 is shown in FIG. 4 and includes a doser body 434, a doser inlet 436, and a doser outlet 438. The flash-boil doser 428 is similar to flash boil doser 28 and similar reference numbers in the 400 series are used in FIG. 4 to denote similar features between flash-boil doser 28 and flash boil doser 428. The flash-boil doser 428 is different from the flash-boil doser 28 in that the doser inlet 436 and the doser outlet 438 are both coupled to a bottom wall 443 of the doser body 434.

Each of the flash-boil dosers 28, 228, 328, 428 may be used with various embodiments of exhaust aftertreatment systems as shown in FIGS. 5-11. As described above, the exhaust aftertreatment system 14 includes a plurality of exhaust aftertreatment devices such as, for example, DOC 18, DPF 20, (SCR) 22, and the reducing agent mixer 24. The flash-boil dosers 28, 228, 328, 428 are mounted to the mixing can 26 of the reducing agent mixer 24 to inject the reducing agent into the mixing chamber 32 upstream of the SCR 22. In other embodiments, more than one SCR and/or reducing agent 24 may be used as will be described.

Figure 6:
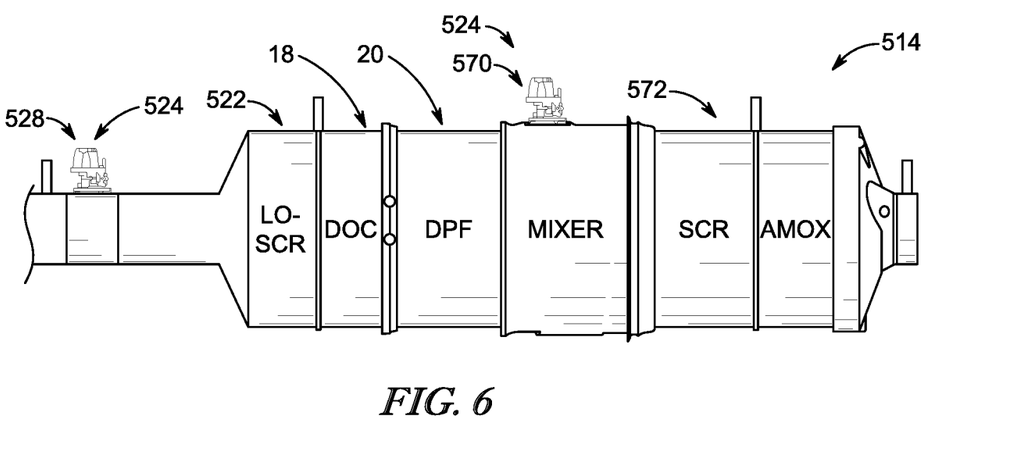
FIG. 6 is a side elevation view of a portion of another exhaust aftertreatment system including a flash-boil doser mounted to an exhaust conduit and a second doser downstream of the flash-boil doser.

A second embodiment of an exhaust after treatment system 514 is shown in FIG. 6. The exhaust aftertreatment system 514 is similar to exhaust aftertreatment system 14 and similar reference numbers in the 500 series are used to denote similar features that are common between exhaust aftertreatment system 14 and exhaust aftertreatment system 514 except for the differences described below.

The exhaust aftertreatment system 514 includes a first reducing agent mixer 524 with a flash-boil doser 528, a first SCR 522, a second reducing agent mixer 570, and a second SCR 572 as shown in FIG. 6. The first reducing agent mixer 524 with the flash-boil doser 528 is located upstream and spaced apart from all of the other aftertreatment devices.

Figure 7:
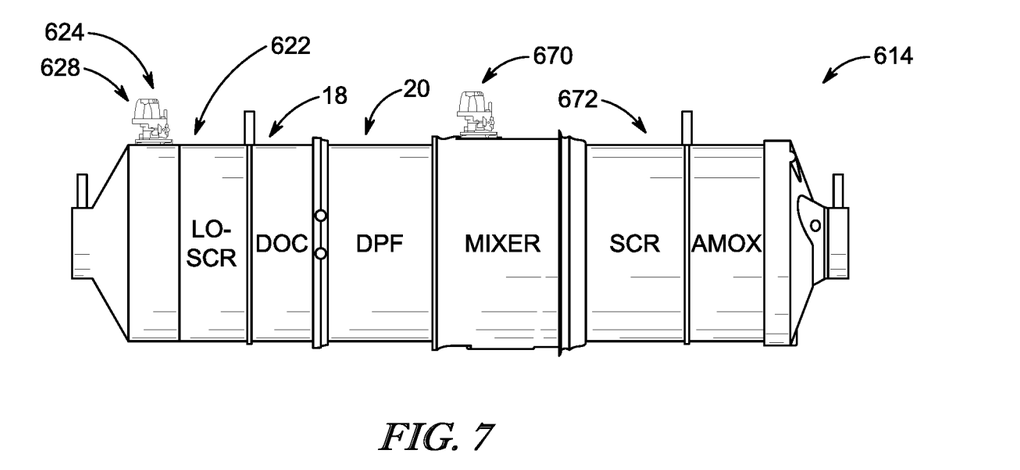
FIG. 7 is a side elevation view of a portion of another exhaust aftertreatment system including a flash-boil doser mounted to an exhaust conduit and a second doser downstream of the flash-boil doser.

A third embodiment of an exhaust after treatment system 614 is shown in FIG. 7. The exhaust aftertreatment system 614 is similar to exhaust aftertreatment system 514 and similar reference numbers in the 600 series are used to denote similar features that are common between exhaust aftertreatment system 514 and exhaust aftertreatment system 614 except for the differences described below.

The exhaust aftertreatment system 614 includes a first reducing agent mixer 624 with a flash-boil doser 628, a first SCR 622, a second reducing agent mixer 670, and a second SCR 672 as shown in FIG. 7. The first reducing agent mixer 624 with the flash-boil doser 628 is located upstream and immediately adjacent to the first SCR 622.

Figure 8:
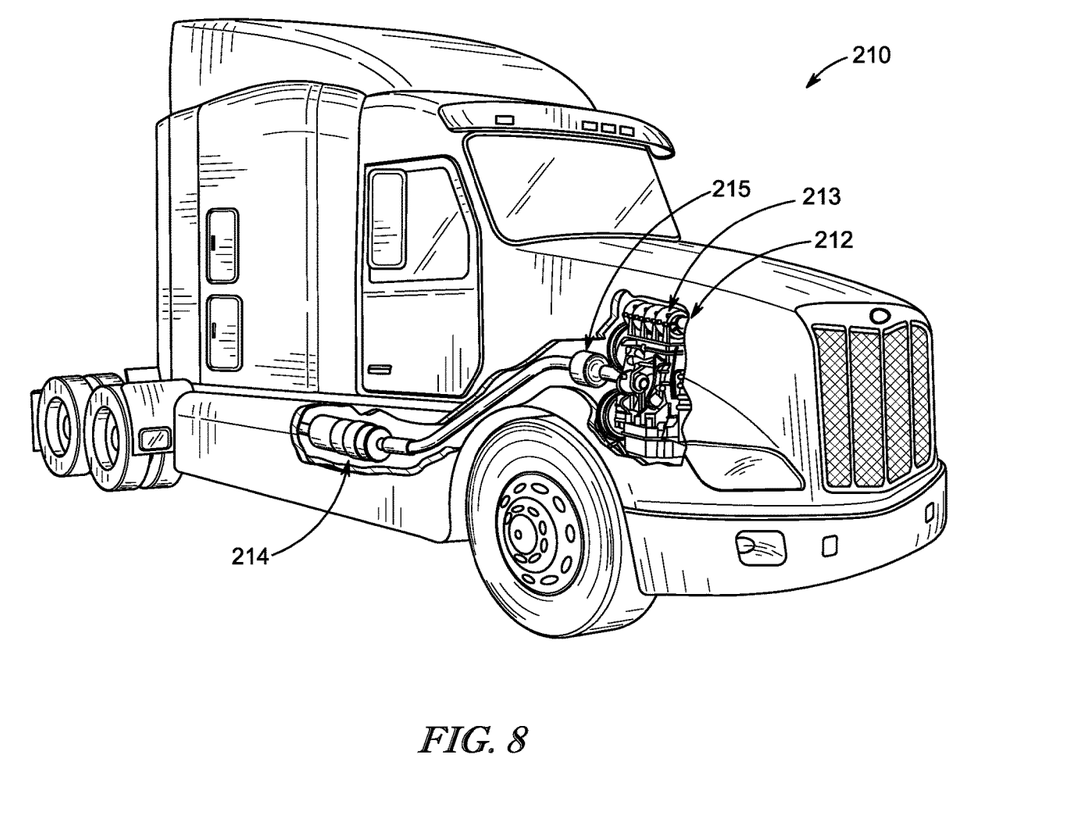
FIG. 8 is perspective view of another automotive vehicle including an internal combustion engine and an exhaust aftertreatment system with an upstream reducing agent mixer located within an engine compartment of the vehicle and a downstream reducing agent mixer.

An illustrative automotive vehicle 210 is shown in FIG. 8 with an internal combustion engine 212 contained within an engine compartment 513, a downstream exhaust after treatment system 214, and an upstream exhaust aftertreatment system 215 spaced apart from the downstream exhaust aftertreatment system 214. The upstream exhaust aftertreatment system 215 is close-coupled with the engine 214 within the engine compartment 213. Some examples of exhaust aftertreatment systems with a close coupled reducing agent mixer in accordance with the present disclosure are shown in FIGS. 9-11 and described below.

Figure 9:
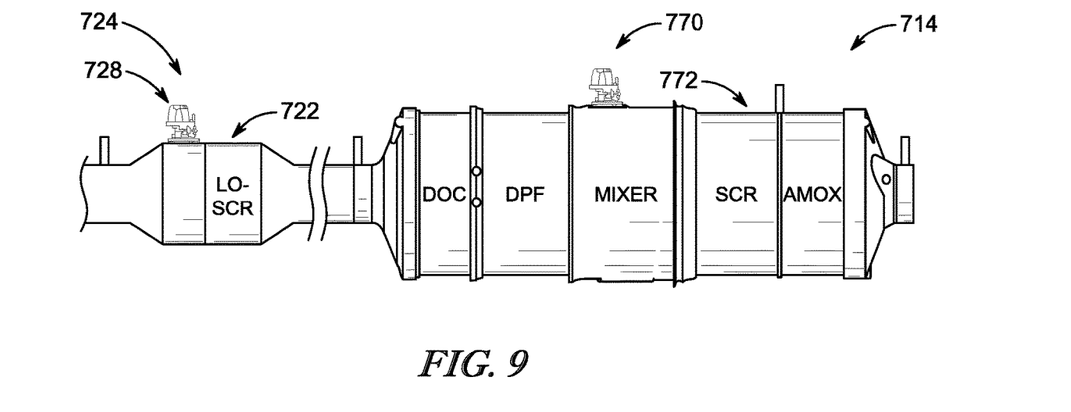
FIG. 9 is a side elevation view of a portion of the exhaust aftertreatment system from FIG. 8 showing a flash-boil doser included in the upstream reducing agent mixer and a second doser included the downstream reducing agent mixer.

A fourth embodiment of an exhaust after treatment system 714 is shown in FIG. 9. The exhaust aftertreatment system 714 is similar to exhaust aftertreatment system 614 and similar reference numbers in the 700 series are used to denote similar features that are common between exhaust aftertreatment system 614 and exhaust aftertreatment system 714 except for the differences described below.

The exhaust aftertreatment system 714 includes a first reducing agent mixer 724 with a flash-boil doser 728, a first SCR 722, a second reducing agent mixer 770, and a second SCR 772 as shown in FIG. 9. The first reducing agent mixer 724 with the flash-boil doser 728 and the first SCR 722 are close-coupled with the engine 212 while the second reducing agent mixer 770 and the second SCR 772 are located downstream from the flash-boil doser 728 and the first SCR 722. The flash-boil doser 724 is located immediately adjacent to the first SCR 722.

Figure 10:
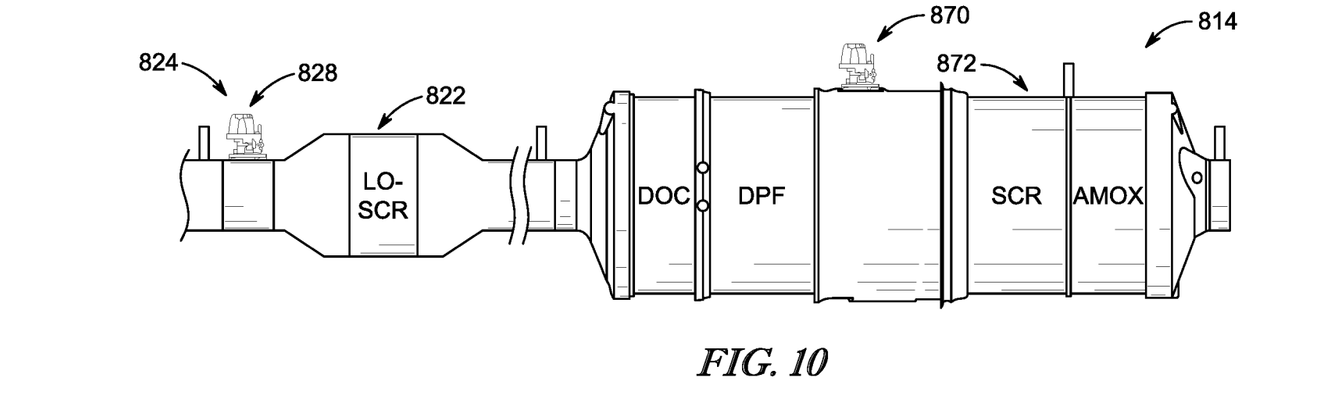
FIG. 10 is a side elevation view of a portion of another exhaust aftertreatment system showing a flash-boil doser included in the upstream reducing agent mixer and a second doser included the downstream reducing agent mixer.
Figure 11:
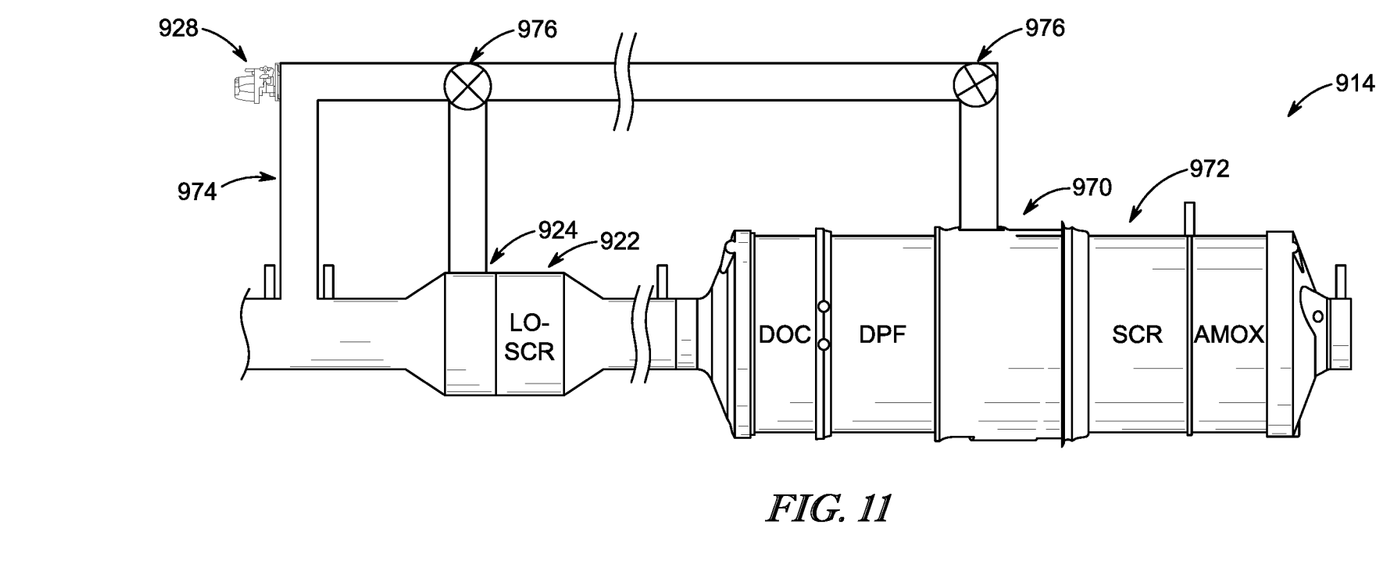
FIG. 11 is a side elevation view of a portion of the exhaust aftertreatment system showing a flash-boil doser configured to supply reducing agent to both the upstream reducing agent mixer and the downstream reducing agent mixer.

A fifth embodiment of an exhaust after treatment system 814 is shown in FIG. 10. The exhaust aftertreatment system 814 is similar to exhaust aftertreatment system 714 and similar reference numbers in the 800 series are used to denote similar features that are common between exhaust aftertreatment system 714 and exhaust aftertreatment system 814 except for the differences described below.

The exhaust aftertreatment system 814 includes a first reducing agent mixer 824 with a flash-boil doser 828, a first SCR 822, a second reducing agent mixer 870, and a second SCR 872 as shown in FIG. 10. The first reducing agent mixer 824 with the flash-boil doser 828 and the first SCR 822 are close-coupled with the engine 212 while the second reducing agent mixer 870 and the second SCR 872 are located downstream from the flash-boil doser 828 and the first SCR 822. Additionally, the flash-boil doser 828 is spaced apart upstream from the first SCR 822.

A sixth embodiment of an exhaust after treatment system 914 is shown in FIG. 11. The exhaust aftertreatment system 914 is similar to exhaust aftertreatment system 714 and similar reference numbers in the 900 series are used to denote similar features that are common between exhaust aftertreatment system 714 and exhaust aftertreatment system 914 except for the differences described below.

The exhaust aftertreatment system 914 includes a first reducing agent mixer 924, a first SCR 922, a second reducing agent mixer 970, and a second SCR 972 as shown in FIG. 10. The first reducing agent mixer 924 and the first SCR 922 are close-coupled with the engine 212 while the second reducing agent mixer 970 and the second SCR 972 are located downstream from the first reducing agent mixer 924 and the first SCR 922. A conduit 974 extends from the exhaust passageway 916 to each of the reducing agent mixers 924, 970. A flash-boil doser 928 is coupled to the conduit 974 and spaced apart exhaust passageway 916. The flash-boil doser 928 is configured to inject reducing agent into the conduit 974 which is conducted through the conduit 974 to both reducing agent mixers 924, 970. Corresponding check valves 976 are positioned upstream of each reducing agent mixer 924, 970 to regulate an amount of reducing agent delivered to each.

Figure 12:
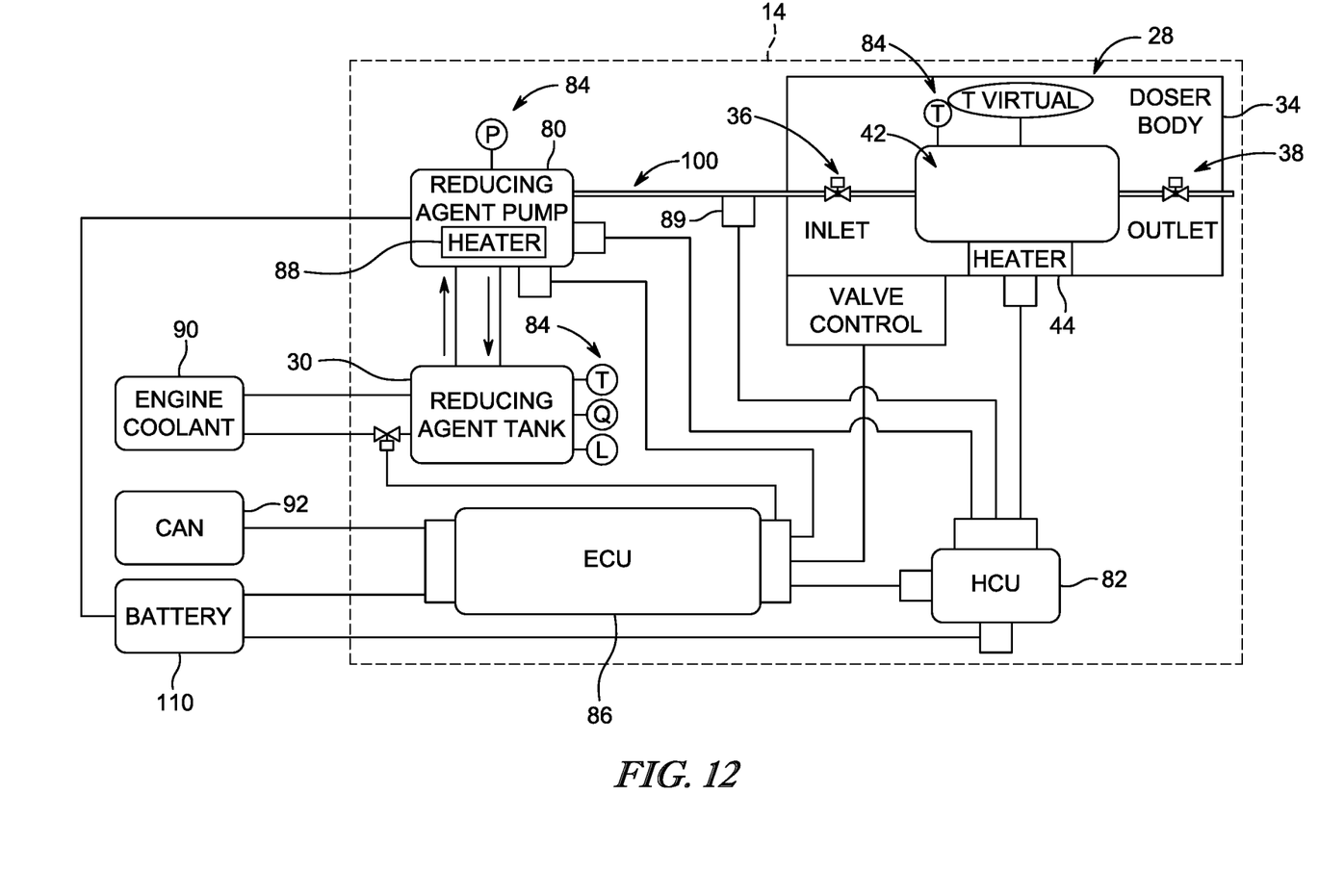
FIG. 12 is a diagrammatic view of various components and devices that may be included in the vehicles of FIGS. 1 and 8 with an exhaust aftertreatment system including a reducing agent tank, a reducing agent pump, a flash-boil doser, and a heater control unit.
Figure 13:
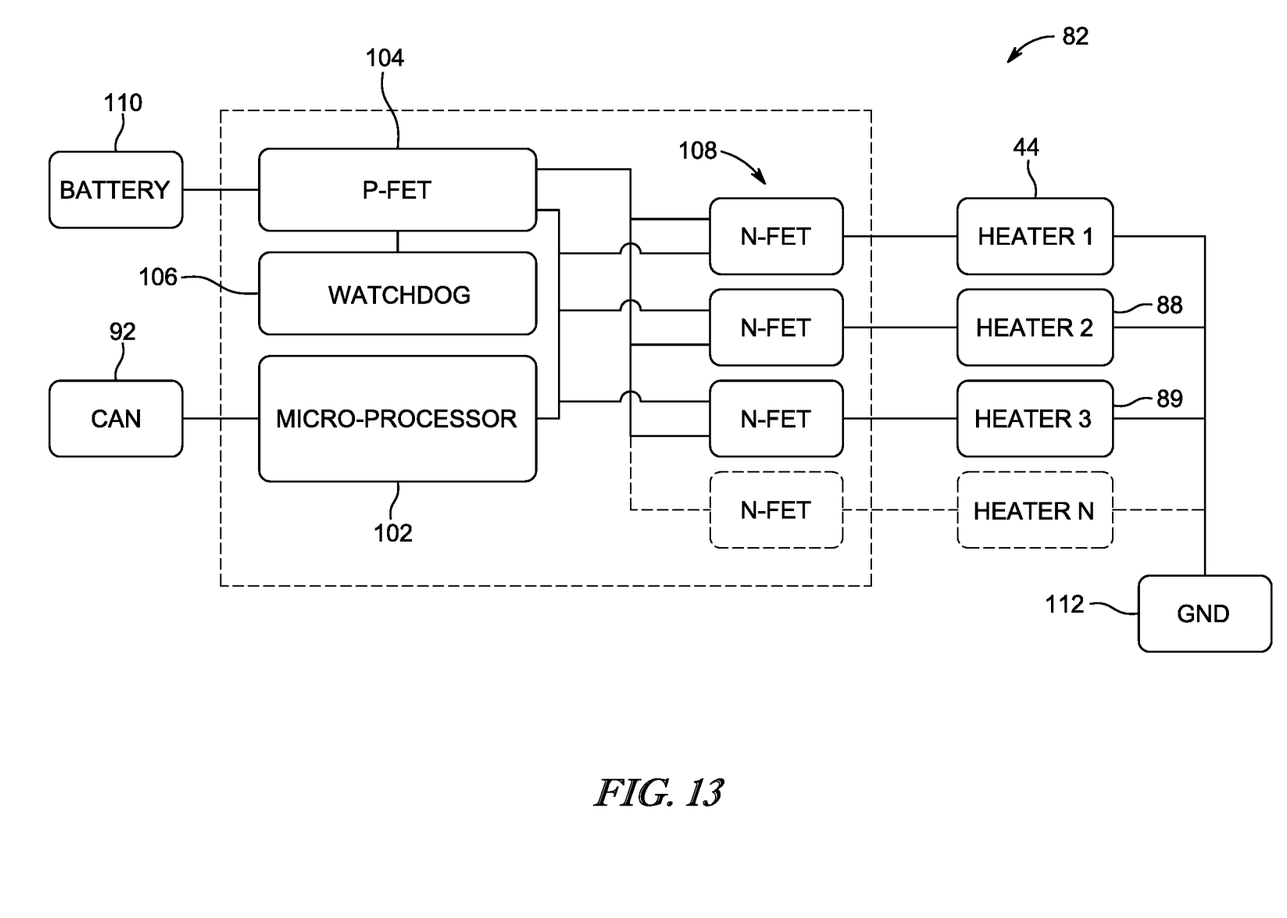
FIG. 13 is a diagrammatic view of the heater control unit of FIG. 12.
Figure 14:
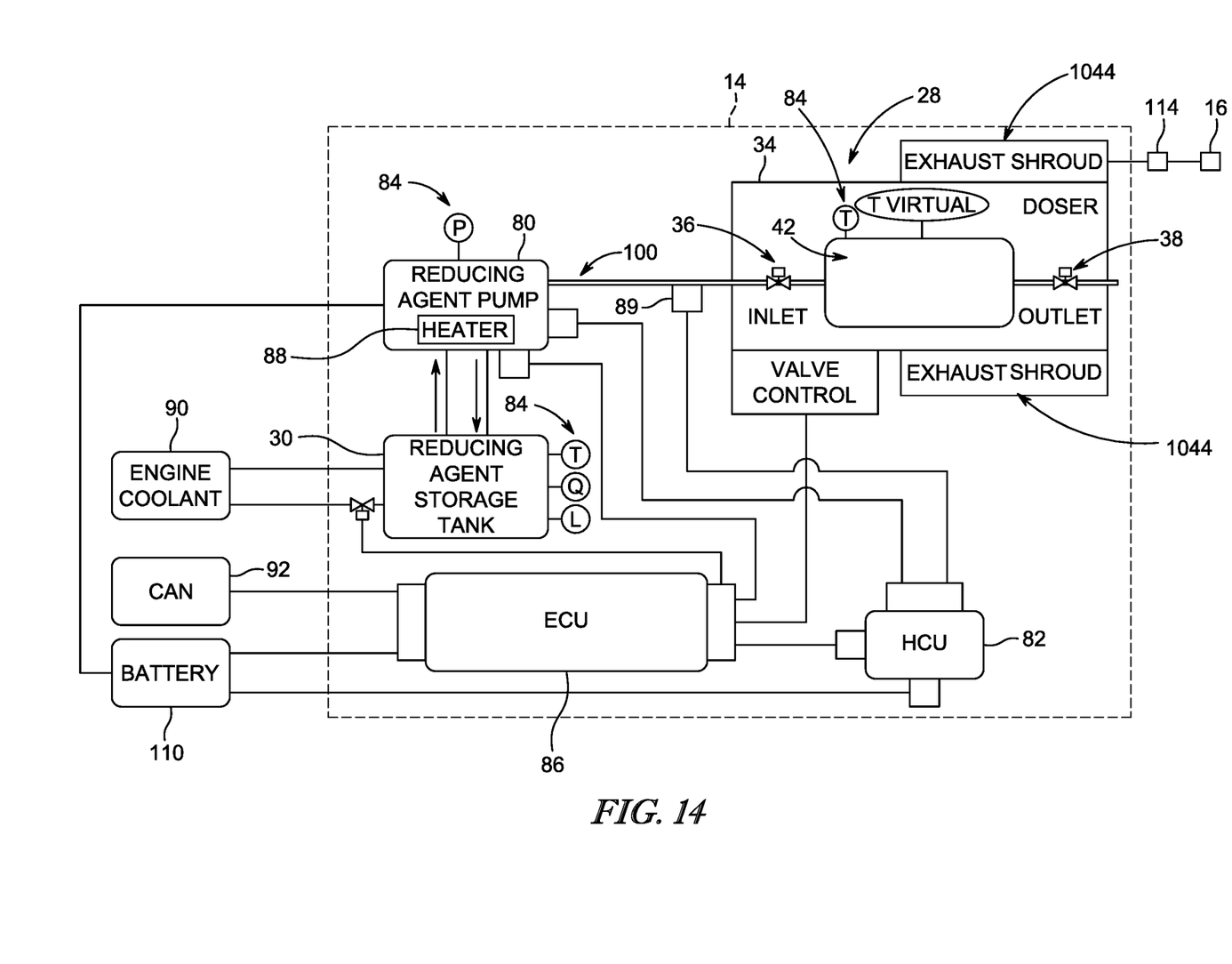
FIG. 14 is a diagrammatic view of various components and devices that may be included in the vehicles of FIGS. 1 and 8 with another exhaust aftertreatment system.

Referring now to FIGS. 12-14, a diagrammatic view of the exhaust aftertreatment system 14 is shown with other components or units associated with the exhaust aftertreatment system 14. The exhaust aftertreatment system 14 includes the flash-boil doser 28, the reducing agent tank 30, a reducing agent pump 80 and a heater control unit (HCU) 82 as shown in FIG. 12. A plurality of sensors 84 are coupled to the reducing agent tank 30, the reducing agent pump 80 and the flash-boil doser 28. The sensors 84 are configured to measure properties of reducing agent associated with/retained in each component to which they are coupled and output signals to an electronic control unit (ECU) 86. For example, the sensors 84 may measure temperature, pressure, flow rate, fluid level, and/or other properties at the locations shown. The ECU 86 receives the signals and includes all of the functionality necessary to operate each of the components associated with the exhaust aftertreatment system 14 in response to the sensor signals output from one or more of the sensors 84.

The reducing agent pump 80 is configured to displace reducing agent stored in the reducing agent tank 30 to the flash-boil doser 28. Unused reducing agent may be returned to the reducing agent tank 30. A pre-heater 88 is coupled to the reducing agent pump 80 and is configured to selectively heat the reducing agent displaced from the reducing agent tank 30 before the reducing agent reaches the flash-boil doser 28. Engine coolant 90 may be routed to the reducing agent tank 30 to cool returned, pre-heated reducing agent. An additional pre-heater 89 is coupled to a line 100 used to transfer the displaced reducing agent from the reducing agent pump 80 to the flash-boil doser 28. In the illustrative embodiment shown in FIG. 12, each of the heaters 44, 88, 89 are electric heaters.

The ECU 86 is coupled with a controlled area network (CAN) 92 that allows each of the components associated with the exhaust aftertreatment system 14 to communicate with one another during operation. The ECU 86 is also coupled to the HCU 82 which is used to control the function of each of the heaters 44, 88, 89 depending on the signals output from each of the sensors 84 and received by the ECU 86.

The HCU 92 includes a microprocessor 102, at least one p-channel field-effect transistor (P-FET) 104, a watchdog timer 106 coupled to the P-FET 104, and a plurality of n-channel field-effect transistors (N-FET) 108 as shown in FIG. 13. The microprocessor 102 is coupled to the CAN 92 to receive instructions from the ECU 86 that, when executed by the microprocessor 102, cause the P-FET 104 and each of the N-FETs 108 to output selectively power from a battery 110 to each of the heaters 44, 88, 89 in response to the signals provided by the sensors 84 to the ECU 86. Accordingly, each of the heaters 44, 88, 89 may be controlled individually to apply increased or reduced thermal energy to their corresponding components. The watchdog timer 106 is used to enable the P-FET 104 as a main relay. Any number of heaters and associated N-FETs 108 may be used in the exhaust aftertreatment system 14. Each of the heaters are grounded at 112.

In other embodiments, different types of heaters may be used and associated with the various components of the exhaust aftertreatment system 14. For example, a heater 1044 may be embodied as an exhaust shroud that diverts hot exhaust gases from the exhaust passageway 16 to the flash-boil doser 28 as shown in FIG. 14. The heater 1044 is fluidly coupled to the exhaust passageway 16 to receive hot exhaust gases that drive heating of the reducing agent resident in the flash-boil chamber 42. The heater control unit 92 is configured to adjust at least one valve 114 to modulate the flow of hot exhaust gases from the exhaust passageway 16 to the heater 1044 in order to manipulate operation of the heater 1044 of the flash-boil doser 28.

In illustrative embodiments, the inlet valve 250 is used to let cold DEF (reducing agent) flow into the chamber and outlet valve 252 is used to let cold/hot DEF flow out of the chamber towards the nozzle. In this illustrative disclosure, one single valve 258 replaces separate inlet and outlet valves. This single valve 258 will perform the same functions which otherwise will be performed by separate inlet and outlet valve. In another embodiment, inlet valve is replaced by an orifice 52, 54. The orifice 52, 54 is sized in such a way that even in an increased pressure inside the heating chamber 42 situation, DEF solution inside chamber doesn't backflow.

In illustrative embodiments, the heater 44, 244 within the heating chamber 42, 242 heats the DEF to 160C. At this temperature the DEF is at the saturated vapor pressure. At this temperature range DEF cavitation could occur. Another potential problem may be the temperature limits of the mechatronics of the injector assembly 28, 228 (i.e. plastic housing 40 and coil 44). To help mitigate these issues, a cooling system is included. The cooling system includes plumbing 62, 64, 66, 262, 264, 266 (metal tubing made of stainless steel, aluminum, or suitable DEF resistant material) in strategic areas to selectively cool these areas below the cavitation threshold and the mechatronic components.

In illustrative embodiments, the flash boiling doser 28, 228 can be used as a second doser under floor or in close coupled position closer to the engine 12, 212 with a low temperature SCR 22. The doser may be easy to install into a inpipe mixing or a compact mixing location. The flash boiling doser 28, 228 can be used with the main underfloor SCR. The flash boiling doser 28, 228 can be used to dose hot or at ambient temperatures. The same doser 28, 228 can also be used for both the low temperature SCR and the main underfloor SCR.

In some embodiments, the electrical heaters 44 may be replaced with heat from the exhaust (i.e. heater 1044). There is a valve 114 to control the exhaust flow through the exhaust shroud 1044. The shroud 1044 surrounds the doser body 34, 234 allowing the exhaust gas to heat the doser 28, 228.

The following numbered clauses include embodiments that are contemplated and non-limiting:

Clause 1. A reducing agent mixer for use in an exhaust aftertreatment system for an over-the-road vehicle, the reducing agent mixer comprising a mixing can defining at least a portion of an exhaust passageway for receiving a flow of exhaust gases therein.

Clause 2. The reducing agent mixer of clause 1, any other suitable clause, or any combination of suitable clauses, further comprising a flash-boil doser mounted to the mixing can and configured to inject a reducing agent through an injection aperture formed in the mixing can.

Clause 3. The reducing agent mixer of clause 2, any other suitable clause, or any combination of suitable clauses, wherein the flash-boil doser including (i) a doser body that defines a flash-boil chamber with at least one heater arranged in the flash-boil chamber to heat reducing agent and thereby increase a pressure within the flash-boil chamber.

Clause 4. The reducing agent mixer of clause 3, any other suitable clause, or any combination of suitable clauses, wherein the flash-boil doser further includes (ii) a doser inlet coupled to the doser body that defines an inlet passageway that opens into the flash-boil chamber to admit reducing agent from an associated reducing agent tank.

Clause 5. The reducing agent mixer of clause 4, any other suitable clause, or any combination of suitable clauses, wherein the flash-boil doser further includes (iii) a doser outlet coupled to the doser body that defines an outlet passageway that opens from the flash-boil chamber into the exhaust passageway of the mixing can.

Clause 6. The reducing agent mixer of clause 5, any other suitable clause, or any combination of suitable clauses, wherein the doser outlet includes a pressure-activated outlet valve that blocks or allows flow through the outlet passageway.

Clause 7. The reducing agent mixer of clause 6, any other suitable clause, or any combination of suitable clauses, wherein the pressure-activated outlet valve is configured to move from a normally-closed position to an open position when a predetermined pressure within the flash-boil chamber is reached to discharge the heated reducing agent from the flash-boil chamber through the outlet passageway and into the exhaust passageway for mixing with the exhaust gases therein during use of the reducing agent mixer in the over-the-road vehicle.

Clause 8. The reducing agent mixer of clause 7, any other suitable clause, or any combination of suitable clauses, wherein the doser inlet includes an inlet tube defining the inlet passageway having a first cross-sectional area and an orifice plate that defines an orifice aperture therethrough having a second cross-sectional area that is smaller than the first cross-sectional area, and wherein the orifice plate is arranged in the inlet tube to restrict flow through the inlet passageway.

Clause 9. The reducing agent mixer of clause 8, any other suitable clause, or any combination of suitable clauses, wherein the orifice aperture is sized to admit reducing agent through the orifice plate and into the flash-boil chamber when the pressure within the flash-boil chamber is below the predetermined pressure and to limit reducing agent from flowing from the flash-boil chamber back through the orifice aperture away from the flash-boil chamber when the pressure within the flash-boil chamber is at or above the predetermined pressure.

Clause 10. The reducing agent mixer of clause 8, any other suitable clause, or any combination of suitable clauses, the flash-boil doser further includes (iv) a cooling system configured to selectively cool the temperature of components included in the flash-boil doser.

Clause 11. The reducing agent mixer of clause 10, any other suitable clause, or any combination of suitable clauses, wherein the cooling system includes at least one of a first cooler coupled to an outer surface of the doser inlet and aligned axially with the orifice plate.

Clause 12. The reducing agent mixer of clause 11, any other suitable clause, or any combination of suitable clauses, wherein the cooling system further includes a second cooler coupled to the doser body.

Clause 13. The reducing agent mixer of clause 12, any other suitable clause, or any combination of suitable clauses, wherein the cooling system includes a third cooler coupled to the doser outlet and aligned axially with the pressure-activated valve.

Clause 14. The reducing agent mixer of clause 7, any other suitable clause, or any combination of suitable clauses, wherein the pressure-activated valve includes an inlet valve that blocks or allows flow through the inlet passageway and a connector rod mechanically interconnecting the inlet valve and the outlet valve, the connector rod configured to cause the inlet valve to move to a closed position in response to motion of the pressure-activated outlet valve to the opened position and to cause the inlet valve to move to an opened position in response to motion of the pressure-activated outlet valve to the closed position.

Clause 15. The reducing agent mixer of clause 14, any other suitable clause, or any combination of suitable clauses, the flash-boil doser further includes (iv) a cooling system configured to selectively cool the temperature of components included in the flash-boil doser, the cooling system including at least one of a first cooler coupled to an outer surface of the doser inlet and aligned axially with the orifice plate, a second cooler coupled to the doser body, and a third cooler coupled to the doser outlet and aligned axially with the pressure-activated valve.

Clause 16. An exhaust after treatment system comprising an exhaust conduit defining an exhaust passageway for receiving a flow of exhaust gases therein.

Clause 17. The exhaust after treatment system of clause 16, any other suitable clause, or any combination of suitable clauses further comprising a first reducing agent mixer coupled fluidly with the exhaust conduit and configured to receive the exhaust gases and inject a reducing agent into the exhaust gases.

Clause 18. The exhaust after treatment system of clause 17, any other suitable clause, or any combination of suitable clauses, wherein the reducing agent mixer includes a mixing can defining at least a portion of the exhaust passageway for receiving the exhaust gases therein.

Clause 19. The exhaust after treatment system of clause 18, any other suitable clause, or any combination of suitable clauses, wherein the reducing agent mixer further includes a flash-boil doser mounted to the mixing can and configured to inject a reducing agent through an injection aperture formed in the mixing can.

Clause 20. The exhaust after treatment system of clause 19, any other suitable clause, or any combination of suitable clauses, wherein the flash-boil doser includes (i) a doser body that defines a flash-boil chamber with at least one heater arranged in the flash-boil chamber to heat reducing agent and thereby increase a pressure within the flash-boil chamber.

Clause 21. The exhaust after treatment system of clause 20, any other suitable clause, or any combination of suitable clauses, wherein the flash-boil doser further includes (ii) a doser inlet coupled to the doser body that defines an inlet passageway that opens into the flash-boil chamber to admit reducing agent from an associated reducing agent tank.

Clause 22. The exhaust after treatment system of clause 21, any other suitable clause, or any combination of suitable clauses, wherein the flash-boil doser further includes (iii) a doser outlet coupled to the doser body that defines an outlet passageway that opens from the flash-boil chamber into the exhaust passageway of the mixing can.

Clause 23. The exhaust after treatment system of clause 22, any other suitable clause, or any combination of suitable clauses, wherein the doser outlet includes a pressure-activated outlet valve that blocks or allows flow through the outlet passageway.

Clause 24. The exhaust after treatment system of clause 23, any other suitable clause, or any combination of suitable clauses, wherein the pressure-activated outlet valve is configured to move from a normally-closed position to an open position when a predetermined pressure within the flash-boil chamber is reached to discharge the heated reducing agent from the flash-boil chamber through the outlet passageway and into the exhaust passageway for mixing with the exhaust gases therein during use of the reducing agent mixer in the over-the-road vehicle.

Clause 25. The system of clause 24, any other suitable clause, or any combination of suitable clauses, further comprising a second reducing agent mixer coupled to the exhaust conduit downstream of the first reducing agent mixer, the second reducing agent mixer including a second mixing can defining at least a portion of the exhaust passageway for receiving the exhaust gases therein and a secondary doser mounted to the second mixing can, wherein the secondary doser is configured to inject reducing agent through a second injection aperture formed in the second mixing can.

Clause 26. The system of clause 25, any other suitable clause, or any combination of suitable clauses, further comprising a first selective catalytic reduction unit mounted to the exhaust conduit downstream of the first reducing agent mixer and a second selective catalytic reduction unit mounted to the exhaust conduit downstream of the second reducing agent mixer.

Clause 27. The system of clause 26, any other suitable clause, or any combination of suitable clauses, wherein the first selective catalytic reduction unit is spaced apart from the first reducing agent mixer and the second selective catalytic reduction unit is positioned immediately downstream of the second reducing agent mixer.

Clause 28. The system of clause 26, any other suitable clause, or any combination of suitable clauses, wherein the first reducing agent mixer and the first selective catalytic reduction unit are close-coupled relative to a source of the exhaust gases and the second reducing agent mixer.

Clause 29. An over the road vehicle, the vehicle comprising an internal combustion engine configured to produce a flow of exhaust gases that are conducted through an exhaust passageway defined by an exhaust conduit.

Clause 30. The over the road vehicle of clause 29, any other suitable clause, or any combination of suitable clauses, further comprising an exhaust aftertreatment system comprising a reducing agent tank formed to include an internal region storing a reducing agent therein.

Clause 31. The over the road vehicle of clause 29, any other suitable clause, or any combination of suitable clauses, wherein the exhaust aftertreatment system further includes a reducing agent pump configured to displace reducing agent from the reducing agent tank.

Clause 32. The over the road vehicle of clause 31, any other suitable clause, or any combination of suitable clauses, wherein the exhaust aftertreatment system further includes a flash-boil doser mounted to the mixing can and configured to inject a reducing agent through an injection aperture formed in the mixing can.

Clause 33. The over the road vehicle of clause 32, any other suitable clause, or any combination of suitable clauses, wherein the flash-boil doser includes (i) a doser body that defines a flash-boil chamber with at least one heater arranged in the flash-boil chamber to heat reducing agent and thereby increase a pressure within the flash-boil chamber.

Clause 34. The over the road vehicle of clause 33, any other suitable clause, or any combination of suitable clauses, wherein the flash-boil doser further includes (ii) a doser inlet coupled to the doser body that defines an inlet passageway that opens into the flash-boil chamber to admit reducing agent from an associated reducing agent tank.

Clause 35. The over the road vehicle of clause 34, any other suitable clause, or any combination of suitable clauses, wherein the flash-boil doser further includes (iii) a doser outlet coupled to the doser body that defines an outlet passageway that opens from the flash-boil chamber into the exhaust passageway of the mixing can, wherein the doser outlet includes a pressure-activated outlet valve that blocks or allows flow through the outlet passageway.

Clause 36. The over the road vehicle of clause 35, any other suitable clause, or any combination of suitable clauses, wherein the pressure-activated outlet valve configured to move from a normally-closed position to an open position when a predetermined pressure within the flash-boil chamber is reached to discharge the heated reducing agent from the flash-boil chamber through the outlet passageway and into the exhaust passageway for mixing with the exhaust gases therein during use of the reducing agent mixer in the over-the-road vehicle.

Clause 37. The over the road vehicle of clause 36, any other suitable clause, or any combination of suitable clauses, wherein the exhaust aftertreatment system further includes a reducing agent sensor configured to detect a parameter associated with reducing agent within the exhaust aftertreatment system.

Clause 38. The over the road vehicle of clause 37, any other suitable clause, or any combination of suitable clauses, wherein the exhaust aftertreatment system further includes, a heater control unit in communication with the reducing agent sensor and configured to manipulate operation of the heater of the flash-boil doser based on signals received from the reducing agent sensor.

Clause 39. The over-the-road vehicle of clause 38, any other suitable clause, or any combination of suitable clauses, wherein the exhaust aftertreatment system includes a pre-heater configured to increase the temperature of reducing agent present in at least one of the reducing agent tank and the reducing agent pump, and wherein the heater control unit is configured to manipulate operation of the pre-heater based on signals received from the reducing agent sensor.

Clause 40. The over-the-road vehicle of clause 38, any other suitable clause, or any combination of suitable clauses, wherein the heater of the flash-boil doser is fluidly coupled to the exhaust passageway to receive hot exhaust gases that drive heating of the reducing agent resident in the flash-boil chamber, and wherein the heater control unit is configured to adjust at least one valve to modulate the flow of hot exhaust gases from the exhaust passageway to the heater in order to manipulate operation of the heater of the flash-boil doser.

Clause 41. The over-the-road vehicle of clause 38, any other suitable clause, or any combination of suitable clauses, wherein the heater of the flash-boil doser is electrically coupled to a power source that drives heating of the reducing agent resident in the flash-boil chamber, and wherein the heater control unit is configured to adjust the electrical current applied to the heater of the flash-boil doser in order to manipulate operation of the heater.

The invention claimed is:

1. A reducing agent mixer for use in an exhaust aftertreatment system for an over-the-road vehicle, the reducing agent mixer comprising
a mixing can defining at least a portion of an exhaust passageway for receiving a flow of exhaust gases therein, and
a flash-boil doser mounted to the mixing can and configured to inject a reducing agent through an injection aperture formed in the mixing can, the flash-boil doser including (i) a doser body that defines a flash-boil chamber with at least one heater arranged in the flash-boil chamber to heat reducing agent and thereby increase a pressure within the flash-boil chamber, (ii) a doser inlet coupled to the doser body that defines an inlet passageway that opens into the flash-boil chamber to admit reducing agent from an associated reducing agent tank, and (iii) a doser outlet coupled to the doser body that defines an outlet passageway that opens from the flash-boil chamber into the exhaust passageway of the mixing can, wherein the doser outlet includes a pressure-activated outlet valve that blocks or allows flow through the outlet passageway, the pressure-activated outlet valve configured to move from a normally-closed position to an open position when a predetermined pressure within the flash-boil chamber is reached to discharge the heated reducing agent from the flash-boil chamber through the outlet passageway and into the exhaust passageway for mixing with the exhaust gases therein during use of the reducing agent mixer in the over-the-road vehicle.

2. The reducing agent mixer of claim 1, wherein the doser inlet includes an inlet tube defining the inlet passageway having a first cross-sectional area and an orifice plate that defines an orifice aperture therethrough having a second cross-sectional area that is smaller than the first cross-sectional area, and wherein the orifice plate is arranged in the inlet tube to restrict flow through the inlet passageway.

3. The reducing agent mixer of claim 2, wherein the orifice aperture is sized to admit reducing agent through the orifice plate and into the flash-boil chamber when the pressure within the flash-boil chamber is below the predetermined pressure and to limit reducing agent from flowing from the flash-boil chamber back through the orifice aperture away from the flash-boil chamber when the pressure within the flash-boil chamber is at or above the predetermined pressure.

4. The reducing agent mixer of claim 2, the flash-boil doser further includes (iv) a cooling system configured to selectively cool the temperature of components included in the flash-boil doser, the cooling system including at least one of a first cooler coupled to an outer surface of the doser inlet and aligned axially with the orifice plate, a second cooler coupled to the doser body, and a third cooler coupled to the doser outlet and aligned axially with the pressure-activated outlet valve.

5. The reducing agent mixer of claim 1, wherein the pressure-activated outlet valve includes an inlet valve that blocks or allows flow through the inlet passageway and a connector rod mechanically interconnecting the inlet valve and an outlet valve, the connector rod configured to cause the inlet valve to move to a closed position in response to motion of the pressure-activated outlet valve to the opened position and to cause the inlet valve to move to an opened position in response to motion of the pressure-activated outlet valve to the closed position.

6. The reducing agent mixer of claim 5, the flash-boil doser further includes (iv) a cooling system configured to selectively cool the temperature of components included in the flash-boil doser, the cooling system including at least one of a first cooler coupled to an outer surface of the doser inlet and aligned axially with the orifice plate, a second cooler coupled to the doser body, and a third cooler coupled to the doser outlet and aligned axially with the pressure-activated outlet valve.

7. An exhaust aftertreatment system comprising
an exhaust conduit defining an exhaust passageway for receiving a flow of exhaust gases therein, and
a first reducing agent mixer coupled fluidly with the exhaust conduit and configured to receive the exhaust gases and inject a reducing agent into the exhaust gases, the first reducing agent mixer including:
a mixing can defining at least a portion of the exhaust passageway for receiving the exhaust gases therein, and
a flash-boil doser mounted to the mixing can and configured to inject a reducing agent through an injection aperture formed in the mixing can, the flash-boil doser including (i) a doser body that defines a flash-boil chamber with at least one heater arranged in the flash-boil chamber to heat reducing agent and thereby increase a pressure within the flash-boil chamber, (ii) a doser inlet coupled to the doser body that defines an inlet passageway that opens into the flash-boil chamber to admit reducing agent from an associated reducing agent tank, and (iii) a doser outlet coupled to the doser body, that defines an outlet passageway that opens from the flash-boil chamber into the exhaust passageway of the mixing can, wherein the doser outlet includes a pressure-activated outlet valve that blocks or allows flow through the outlet passageway, the pressure-activated outlet valve configured to move from a normally-closed position to an open position when a predetermined pressure within the flash-boil chamber is reached to discharge the heated reducing agent from the flash-boil chamber through the outlet passageway and into the exhaust passageway for mixing with the exhaust gases therein during use of the reducing agent mixer in the over-the-road vehicle.

8. The system of claim 7, further comprising a second reducing agent mixer coupled to the exhaust conduit downstream of the first reducing agent mixer, the second reducing agent mixer including a second mixing can defining at least a portion of the exhaust passageway for receiving the exhaust gases therein and a secondary doser mounted to the second mixing can, wherein the secondary doser is configured to inject reducing agent through a second injection aperture formed in the second mixing can.

9. The system of claim 8, further comprising a first selective catalytic reduction unit mounted to the exhaust conduit downstream of the first reducing agent mixer and a second selective catalytic reduction unit mounted to the exhaust conduit downstream of the second reducing agent mixer.

10. The system of claim 9, wherein the first selective catalytic reduction unit is spaced apart from the first reducing agent mixer and the second selective catalytic reduction unit is positioned immediately downstream of the second reducing agent mixer.

11. The system of claim 9, wherein the first reducing agent mixer and the first selective catalytic reduction unit are close-coupled relative to a source of the exhaust gases and the second reducing agent mixer.

12. An over-the-road vehicle, the vehicle comprising
an internal combustion engine configured to produce a flow of exhaust gases that are conducted through an exhaust passageway defined by an exhaust conduit, and
an exhaust aftertreatment system comprising
a reducing agent tank formed to include an internal region storing a reducing agent therein,
a reducing agent pump configured to displace reducing agent from the reducing agent tank,
a mixing can defining at least a portion of the exhaust passageway for receiving the exhaust gases therein,
a flash-boil doser mounted to the mixing can and configured to inject a reducing agent through an injection aperture formed in the mixing can, the flash-boil doser including (i) a doser body that defines a flash-boil chamber with at least one heater arranged in the flash-boil chamber to heat reducing agent and thereby increase a pressure within the flash-boil chamber, (ii) a doser inlet coupled to the doser body that defines an inlet passageway that opens into the flash-boil chamber to admit reducing agent from an associated reducing agent tank, and (iii) a closer outlet coupled to the closer body that defines an outlet passageway that opens from the flash-boil chamber into the exhaust passageway of the mixing can, wherein the doser outlet includes a pressure-activated outlet valve that blocks or allows flow through the outlet passageway, the pressure-activated outlet valve configured to move from a normally-closed position to an open position when a predetermined pressure within the flash-boil chamber is reached to discharge the heated reducing agent from the flash-boil chamber through the outlet passageway and into the exhaust passageway for mixing with the exhaust gases therein during use of the reducing agent mixer in the over-the-road vehicle,
a reducing agent sensor configured to detect a parameter associated with reducing agent within the exhaust aftertreatment system, and
a heater control unit in communication with the reducing agent sensor and configured to manipulate operation of the heater of the flash-boil doser based on signals received from the reducing agent sensor.

13. The over-the-road vehicle of claim 12, wherein the exhaust aftertreatment system includes a pre-heater configured to increase the temperature of reducing agent present in at least one of the reducing agent tank and the reducing agent pump, and wherein the heater control unit is configured to manipulate operation of the pre-heater based on signals received from the reducing agent sensor.

14. The over-the-road vehicle of claim 12, wherein the heater of the flash-boil doser is fluidly coupled to the exhaust passageway to receive hot exhaust gases that drive heating of the reducing agent resident in the flash-boil chamber, and wherein the heater control unit is configured to adjust at least one valve to modulate the flow of hot exhaust gases from the exhaust passageway to the heater in order to manipulate operation of the heater of the flash-boil doser.

15. The over-the-road vehicle of claim 12, wherein the heater of the flash-boil doser is electrically coupled to a power source that drives heating of the reducing agent resident in the flash-boil chamber, and wherein the heater control unit is configured to adjust the electrical current applied to the heater of the flash-boil doser in order to manipulate operation of the heater.

* * * * *